A. Landry,
Harrow
No. 100,839.  Patented Aug 30. 1870.

Witnesses:
J. S. Mabee
Geo. W. Mabee

Inventor:
Alcide Landry
per Munn & Co
Attorneys.

UNITED STATES PATENT OFFICE.

ALCIDE LANDRY, OF EAST BATON ROUGE, LOUISIANA.

IMPROVEMENT IN SUGAR-CANE SCRAPER.

Specification forming part of Letters Patent No. 106,839, dated August 30, 1870.

*To all whom it may concern:*

Be it known that I, ALCIDE LANDRY, of East Baton Rouge, in the parish of East Baton Rouge and State of Louisiana, have invented a new and useful Improvement in Sugar-Cane Scraper; and I do hereby declare that the following is a full, clear, and exact description thereof, which will enable others skilled in the art to make and use the same, reference being had to the accompanyng drawing, forming a part of this specification, in which—

Figure 1:
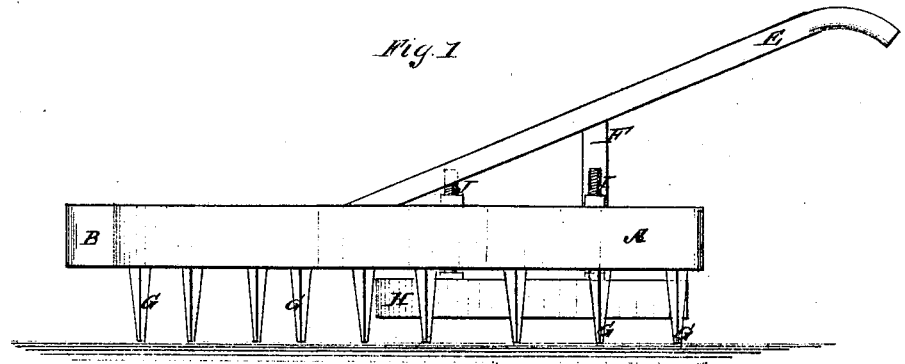
Figure 2:
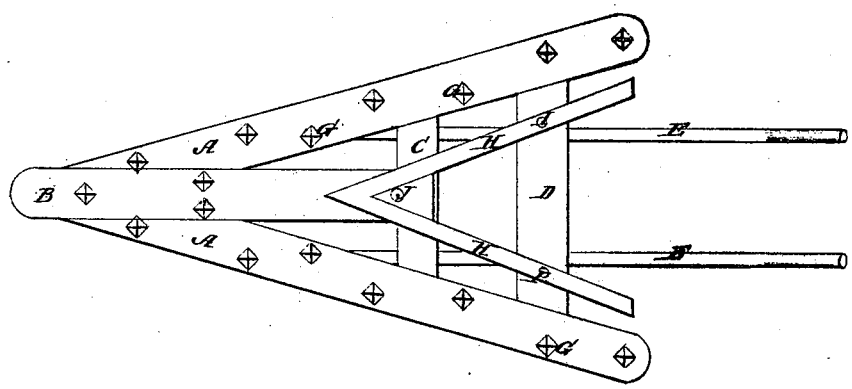

Figure 1 is a side view of my improved sugar-cane scraper. Fig. 2 is an under-side view of the same.

Similar letters of reference indicate corresponding parts.

My invention has for its object to furnish a simple, convenient, and effective machine for scraping and cultivating sugar-cane; and it consists in the machine with its several parts arranged and constructed as hereinafter more fully described.

A are the inclined side bars of the frame, the forward ends of which are attached to the forward part of the sides of the central or draft bar, B. To the rear end of the central bar, B, is attached a cross-bar, C, the ends of which are attached to the middle parts of the side bars, A. The rear parts of the side bars, A, are connected by a second cross-bar, D, as shown in Fig. 2.

E are the handles by means of which the machine is guided. The forward ends of the handles E are attached to the forward parts of the side bars, A, and their rear ends are supported and held in their proper relative positions by being attached to the upper ends of the standards F, the lower ends of which are attached to the rear cross-bar, D.

G are the teeth, which penetrate and stir up the soil, and which are secured in holes in the forward part of the central bar, B, in the inclined side bars, A, as shown in Figs. 1 and 2.

H is the scraper, the forward ends of the bars or plates of which meet at an acute angle, and are securely attached to each other, as shown in Fig. 2. To the rear parts of the side bars or plates of the scraper H are attached the lower ends of two bolts, I, which pass up through the rear cross-bar, D, and have nuts screwed upon their upper ends. To the forward part of the scraper H is attached the lower end of a long ball, J, the upper end of which passes up through the forward cross-bar, C, or through the rear part of the central bar, B, and has a nut screwed upon it.

By this construction, by turning the nuts up or down upon the bolts I J, the scraper H may be lowered or raised, to take a deeper or shallower hold upon the soil, as may be required.

Having thus described my invention, what I claim as new, and desire to secure by Letters Patent, is—

The arrangement, in a sugar-cane scraper, of the inclined side bars, A, central draft-bar, B, cross-bars C D, handles E, teeth G, scraper H, and adjusting-rods I, as shown and described.

ALCIDE LANDRY.

Witnesses:
   AUSTIN HUNT,
   G. S. TROUPEAU.